July 26, 1955  I. OSTUW ET AL  2,713,904
MACHINE FOR CUTTING CONTINUOUS MATERIAL INTO
A SUCCESSION OF PRE-SELECTED LENGTHS
Filed Sept. 26, 1951  4 Sheets-Sheet 1

FIG. I

INVENTORS
IRVING OSTUW
BY HIRAM D. DILLARD

Patrick F. Henry
ATTORNEY

July 26, 1955     I. OSTUW ET AL     2,713,904
MACHINE FOR CUTTING CONTINUOUS MATERIAL INTO
A SUCCESSION OF PRE-SELECTED LENGTHS
Filed Sept. 26, 1951     4 Sheets-Sheet 2

INVENTORS
IRVING OSTUW
BY HIRAM D. DILLARD

ATTORNEY

July 26, 1955

I. OSTUW ET AL 2,713,904

MACHINE FOR CUTTING CONTINUOUS MATERIAL INTO
A SUCCESSION OF PRE-SELECTED LENGTHS

Filed Sept. 26, 1951

INVENTORS
IRVING OSTUW
BY   HIRAM D. DILLARD

Patrick F. Henry
ATTORNEY

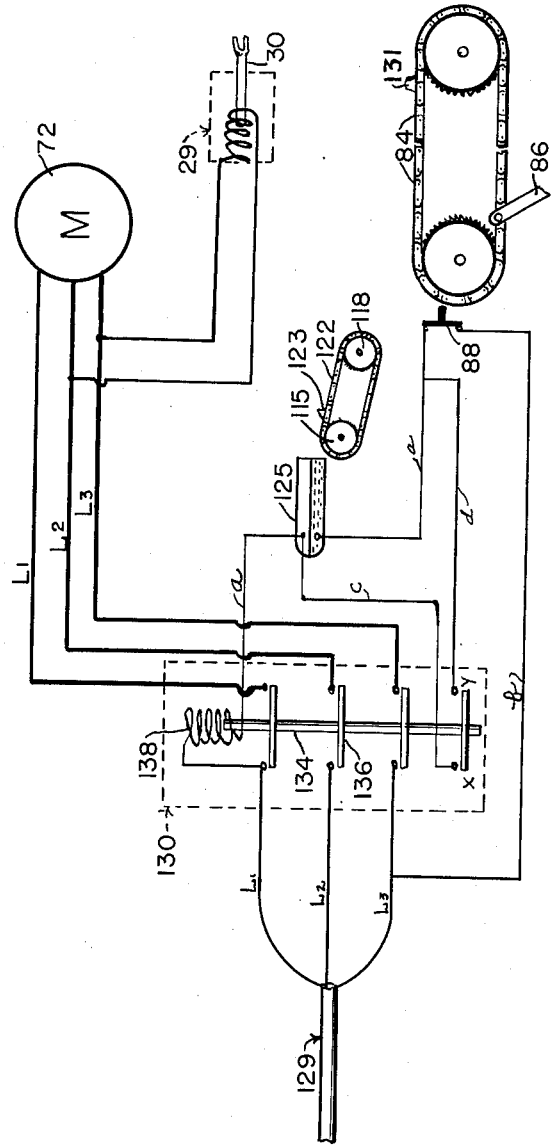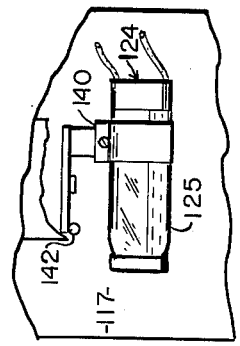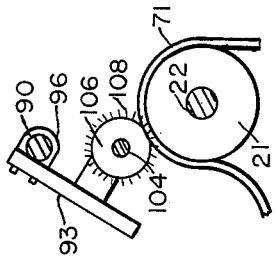
INVENTORS
IRVING OSTUW
BY HIRAM D. DILLARD
ATTORNEY

United States Patent Office 2,713,904
Patented July 26, 1955

2,713,904

MACHINE FOR CUTTING CONTINUOUS MATERIAL INTO A SUCCESSION OF PRE-SELECTED LENGTHS

Irving Ostuw and Hiram D. Dillard, Calhoun, Ga.

Application September 26, 1951, Serial No. 248,368

9 Claims. (Cl. 164—76)

This invention relates to a cutting machine and more particularly to a machine of this sort that is particularly adapted to feed continuous sheet material and cut the material into a succession of pre-selected lengths.

In the production of measured sheet goods, such as bed sheets, rugs, matting, and bed spreads, it is necessary to cut the desired lengths from one continuous piece. Ofttimes, it is particularly desirable to cut the desired length immediately after the material is produced on the loom or, as in the case of loop rugs and chenille goods, immediately after the pile has been formed on the needle machine. This eliminates the winding of the goods and the transfer of the wound rolls to another work area where it is unwound, manually measured, and manually cut.

The present invention provides a machine for receiving and transferring the continuously fed material, measuring it in predetermined lengths or widths, and automatically cutting the material. After each cutting of the material, the machine resumes the condition for the measuring and cutting of the next successive length of material.

In addition, the machine of the present invention provides an adjustment for the length of material cut and an adjustable measuring and drive means which assures an accurate cutting of each length.

As a further component to attain the desired results, the machine of the present invention includes a particular arrangement of movable, power driven cutting mechanism.

Generally described, the present invention comprises a vertical stand having substantially long horizontal beams to accommodate a width of material. A power driven roller is positioned for rotation on the frame and the roller is normally in driving relationship under a continuous sheet of material fed from an external source. One of the horizontal beams is provided with a track in which is positioned the movable cutting device. Also positioned on the frame is a measuring mechanism having measuring wheels which remain in contact with the material. An electrical switch circuit is provided for controlling the operation of the drive roller, the cutting device and the measuring device.

The continuous material is fed by the drive roller down through the machine while the cutting device normally remains in a position out of contact with the material. During the movement of the material the measuring device is being operated through contact with the material, and at a selected interval in the movement of the material, the measuring device actuates the electrical circuit to stop the roller from driving, and to cause the cutting device to contact the material. Then the cutting device makes a complete cut through the material, returns to its normal out of contact position, and contacts an electrical switch to place the machine in a material feeding condition. The entire operation is completely automatic and accurate control means is provided to vary the length of the material cut.

Other details and advantages will be apparent from the following description taken in conjunction with the accompanying drawings, in which:

Fig. 7 is a diagram showing the principal mechanical parts in an electrical circuit of the automatic feeding, measuring, and cutting.

Fig. 8a is a side elevation view showing the relationship between a measuring disc, the material, and the drive roller.

Fig. 9 is an elevation view of the measuring switch and support.

Figure 1:
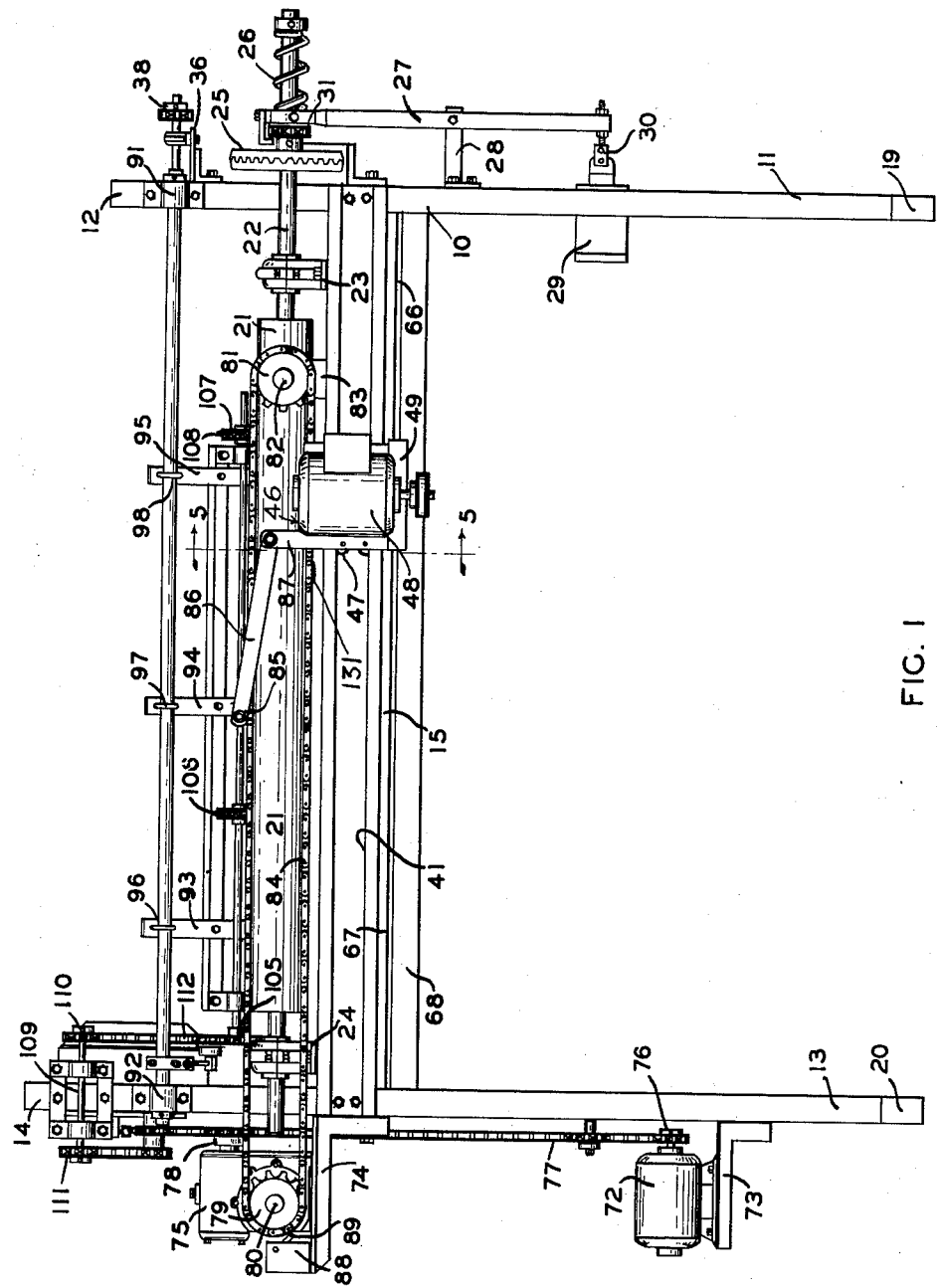
Figure 1 is a front view of the machine of the present invention.
Figure 2:
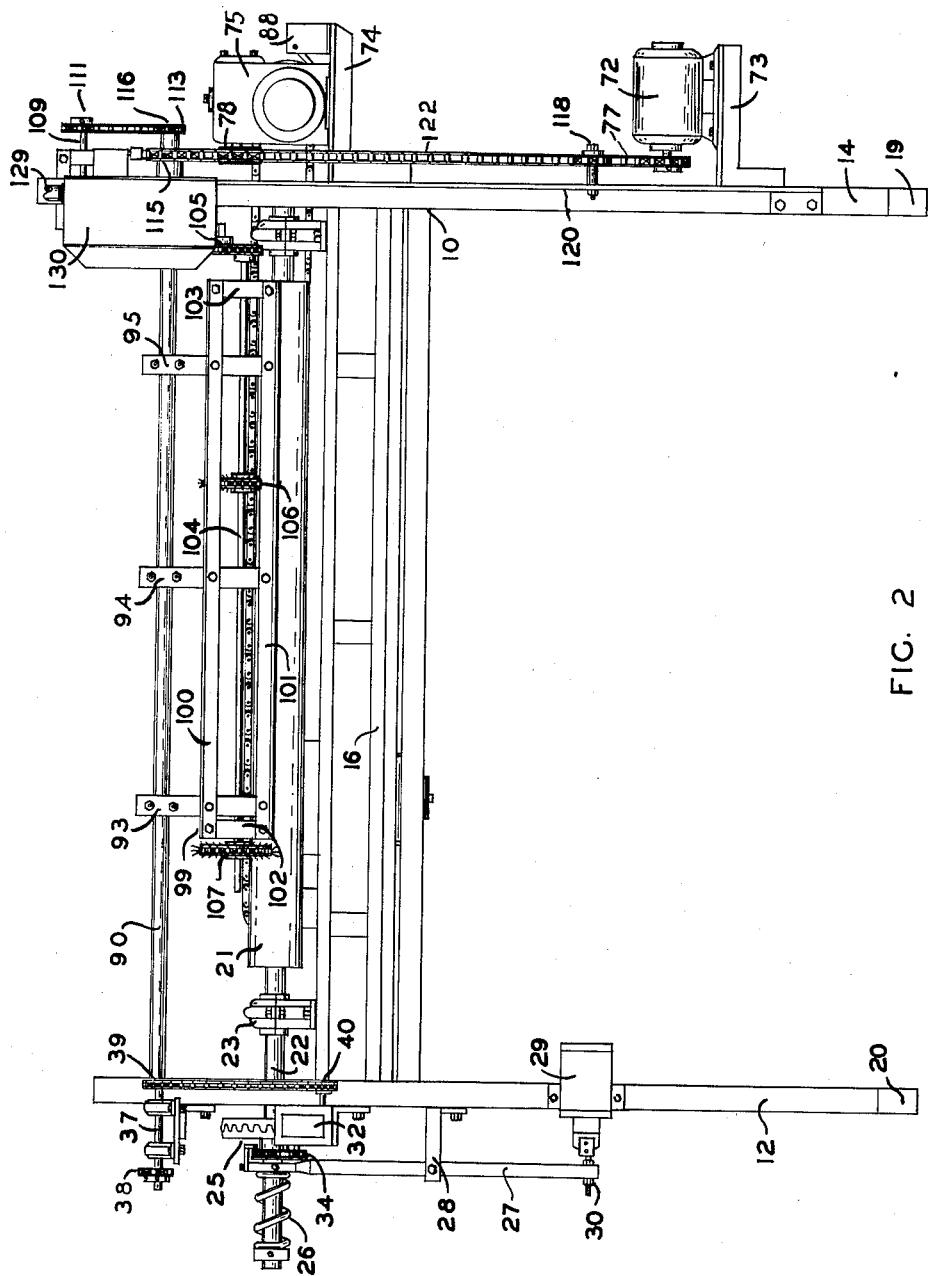
Figure 2 is a back view of the machine shown in Figure 1.

Referring to the drawings for more detail, and particularly Figs. 1 and 2, a machine frame designated generally at 10 comprises upright support members 11, 12, 13, and 14 carrying horizontal beams 15 and 16. Support members 11 and 12 are spaced apart and coupled together by a transverse side member 17 and support members 13 and 14 are arranged in similar fashion by a transverse side member 18 at the opposite end of the beams 15 and 16. This forms a substantially rectangular frame resting on floor support members 19 and 20 joined, respectively, to the opposite pairs of support members 11, 12 and 13, 14.

A drive roller 21 is mounted for rotation on a shaft 22 longitudinally of frame 10 on journals 23 and 24 which are fixed to the horizontal beams 15 and 16. The roller 21 is positioned on journals 23 and 24 is such a manner as to be spaced above the horizontal beams 15 and 16 and with the curved front in a position behind the front beam 15 for a purpose to be described later. Shaft 22 extends beyond the journal 23 at one end of the frame 10 terminating outside the confines of the frame members 11 and 12. A conventional toothed disc clutch, designated generally at 25, is mounted on this protruding end of shaft 22 and is normally retained in driving position by a coil spring 26. Clutch 25 is moved to a non-driving position by means of a conventional shifting fork 27 pivoted on a bracket 28 mounted on frame 10. The shifting fork 27 is moved in or out of position by a heavy solenoid 29 having a movable plunger 30 controlled by an electrical source as will be described hereinafter. Mounted in association with the movable part of clutch 25 is a drive sprocket 31 which drives the roller 21 through the clutch 25.

Figure 3:
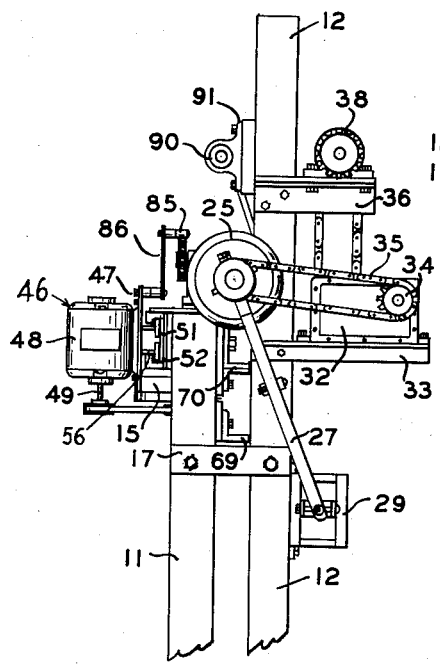
Figure 3 is a right end view of the machine of Figure 1.

A conventional torque converter 32 is fixed on the frame 10 by a platform 33 mounted on the vertical frame member 12, as is readily seen in Fig. 3. Torque converter 32 has an output sprocket 34 in alignment with drive sprocket 31 and sprockets 31 and 34 are connected together for driving by a chain 35. Positioned above the torque converter 32, on frame member 12, is another platform 36 on which is journaled a jack shaft 37 having the power input sprocket 38 on one end and a transfer sprocket 39 on the opposite end. The transfer sprocket 39 is in alignment with and connected to an input sprocket 40 on the torque converter 32. According to this arrangement, a source of power, such as the power taken off from a loom (not shown), is directly coupled to the input sprocket 38 which drives through the transfer sprocket 39 to the torque converter 32. The power is transferred through the torque converter 32, at a selected ratio, to the output sprocket 34 which is in direct driving connection with sprocket 31. When the clutch 25 is engaged, the roller 21 is being driven in a direction toward the front of the frame 10 and when the clutch 25 is disengaged, the sprocket 31 is merely idling on the shaft 22.

Figure 5:
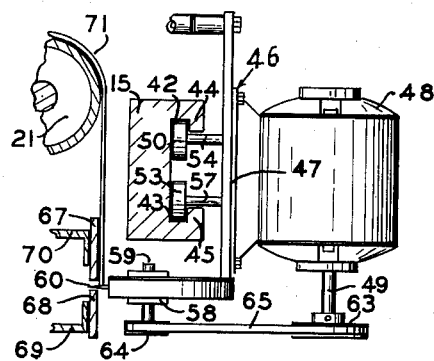
Figure 5 is a section view with parts broken away taken substantially on line 5—5 of Figure 1.
Figure 6:
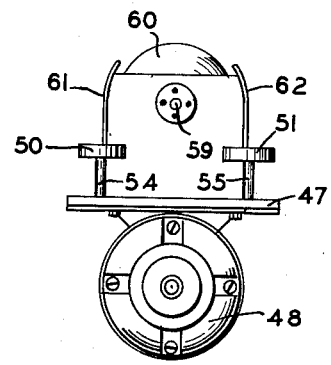
Figure 6 is a top view of a detail of Figure 5.

The front beam 15 of the machine is formed with a vertical track 41 comprising a recessed upper slot 42 and lower slot 43 (see Fig. 5) formed by front flanges 44 and 45. A cutting device designated generally at 46, is positioned on beam 15 for movement across the frame 10. Cutting device 46 comprises a vertical motor plate 47 on which is bolted an electrical motor 48 having a vertical shaft 49. The motor plate 47 has two pairs of wheels, 50, 51, and 52, 53, arranged in a rectangular fashion at each end of the plate 47. The wheels 50, 51, 52, 53 are rotatably mounted on extending shafts 54, 55, 56, 57, respectively, so that one pair of wheels 50, 51 ride in the upper slot 42 while the other pair of wheels 52, 53 ride in the lower slot 43. The front flanges 44 and 45 prevent the wheels from slipping from the slots 42, 43.

The motor plate 47 supports a base plate 58 which is fixed perpendicular to plate 47 and extends below the beam 15. Rotatably mounted on plate 58 on a shaft 59 is a disc type cutting blade 60 having part of the periphery thereof protruding beyond the end of plate 58. A pair of curved guard arms 61, 62 are fixed to the motor plate 47 and extend horizontally therefrom around the exposed side of the blade 60. A pulley 63 is fixed to shaft 49, another pulley 64 is fixed on shaft 59, and the two pulleys 63 and 64 are connected by a drive belt 65. The motor 48 receives power directly from an outside source and when the motor is in operation, the cutting blade 60 is being driven continuously.

A longitudinal slot 66 is formed on the machine by a pair of longitudinal plates 67, 68 extending between and fixed to members 11 and 13. Plates 67, 68 are backed up by a pair of longitudinal strengthening angle members 69, 70. The cutting blade 60 is of sufficient diameter to protrude a distance into the longitudinal slot 66 and the plates 67, 68 are in alignment with the front of the roller 21 so that a sheet material 71 passing over the front of the roller 21 falls behind the front member 15 and across the front of the longitudinal plates 67, 68. The cutting blade 60, extending through the slot 66, will sever the material 71 in alignment with the slot 66 when moved across the frame member 15.

Figure 4:
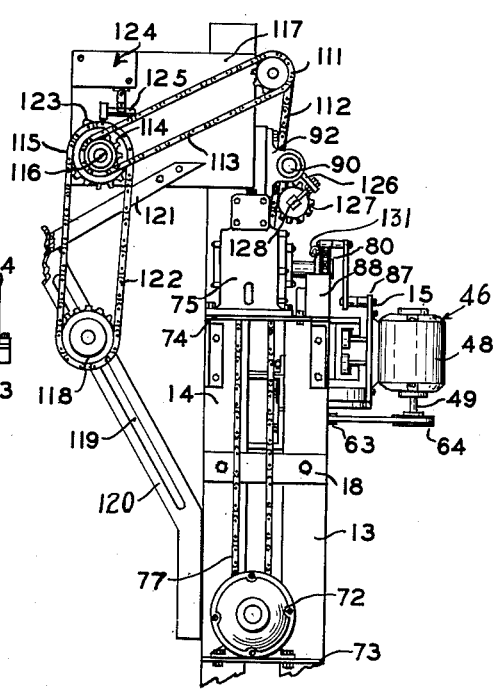
Figure 4 is a left end view of the machine of Figure 1.

The left side of the machine frame 10, as is readily seen in Fig. 4, is provided with the drive means for the cutting device 46 and also with the measuring device to control the interval of cutting. An electric motor 72 rests on a platform 73 fixed to frame members 13 and 14. A second platform 74 fixed to members 13 and 14 above platform 73 supports a conventional gear transmission 75. A drive sprocket 76 on motor 72 is connected by a chain 77 to an input sprocket 78 on the transmission 75. The output sprocket 79 of transmission 75 is located at the front of the machine on a shaft 80. An idler sprocket 81, on a shaft 82, is rotatably supported on a bracket 83 fixed to the top of member 15 near the right hand side. The sprockets 79 and 81 are in alignment and are connected by continuous cutter driving chain 84 extending substantially the length of the machine and immediately behind the vertical motor plate 47 of the cutting device 46.

The cutter driving chain 84 propels the cutting device 46 by means of a connection comprising a connection bracket 85 fixed to the outside of the chain 84 and pivotally connected to a connecting rod 86 which in turn is pivotally connected to a journal portion 87 on the motor plate 47. A wide link 131 protrudes from the surface of the chain 84 to contact a spring biased normally closed switch 88 which is positioned on the support plate 74 at the left end of the machine and adjacent to the outside periphery of the sprocket 79 on the transmission 75. With this arrangement, when the motor 72 is energized, the cutter chain 84 is driven through the action of the transmission 75. Since the cutting device is fixed for movement with the chain 84, by the connecting bracket 85 and the link 86, it moves across the frame member 15 carrying the active cutting blade 60 across the slot 66 thereby severing any material which lies across the face of the plates 67, 68.

The normal position of the cutting device 46 is adjacent to the idler sprocket 81 but with the bracket 85 at the top of the chain; that is, bracket 85 is slightly past the idler 81 in a direction toward the opposite sprocket 79. In this position the cutting blade 60 is out of contact with the material 71 passing over the roller 21 and the blade 60 does not interfere with the travel of the material 71. In order to make a transverse cut of the material 71, the motor 72 is cut in which causes the chain 84 to propel the cutting device 46 across the frame member 15, bringing the cutting blade 60 into contact with the material 71 and severing the material in a line along the slot 66. When the cutting device 46 reaches the opposite end of the machine, that is in the vicinity of the sprocket 79, the material 71 has been completely severed and the cutting device 46 reverses direction to return to its normal position out of contact with the material 71. In order to return the cutting device 46 to normal position, the switch 88 has been provided to break the power to the motor 72 by de-energizing a line starter thereby stopping the power to the chain 84. Switch 88 has a spring biased switch lever 89 situated in the path of a wide link 131 on the chain 84 and located a distance behind the bracket 85. As the wide link 131 passes around the outside of the sprocket 79 it strikes the lever 89 in passing which opens the circuit long enough to release the line starter 130 thereby breaking the motor 72 circuit just before the cutting device 46 arrives at sprocket 81.

The connecting rod 86 pulls the motor plate 47, and all the cutting device 46, and they travel as a unit through the bracket 85 with the chain 84. As the connecting rod 86 travels with the chain 84 it gradually changes position until, upon reaching the sprocket 79 it falls below the horizontal following the fixed bracket 85 and remaining fixed to the same position on the chain 84 at all times. During the travel of the connecting rod 86 across the front of the frame 10 the cutting device is being pulled at a high rate of speed at with a large amount of power derived from the transmission 75. After the power to the chain 84 is terminated, the cutting device 46 continues to travel by its own momentum with the chain 84 in a direction from sprocket 79 to and around the sprocket 81. The travel of the cutting device 86 under its momentum will cease substantially upon the bracket 85 and connecting rod 86 arriving at the top of the sprocket 81 which places the cutting device 46 in an initial cutting position but out of contact with the material 71 on the roller 21.

The measuring device of the present embodiment is supported on a longitudinal shaft 90 journaled in journals 91 and 92 fixed on the vertical frame members 12 and 14, respectively. Depending support arms 93, 94, 95 are adjustably connected to the shaft 90 by U-bolts 96, 97, and 98, respectively. The arms 93, 94 and 95 are fixed to a rectangular measuring frame, designated generally at 99, comprising longitudinal members 100, 101 and side members 102 and 103. A measuring shaft 104 is journaled on the frame 99 and has a fixed drive sprocket 105 on one end adjacent to the side member 103. Measuring shaft 104 also supports a pair of spaced measuring discs 106, 107 each having sharp quills 108 protruding from their surface.

Spaced above the longitudinal shaft 90 and fixed to frame member 14 is a jack shaft 109 having an input sprocket 110 in alignment with the drive sprocket 105 on measuring shaft 104 and an output sprocket 111 positioned on the outside of frame member 14. Sprockets 110 and 105 are connected by a chain 112. The output sprocket 111, in turn, is connected by a chain 113 to the smaller of a pair of sprockets 114, 115 supported on a shaft 116 on a plate member 117 connected to the frame member 14, as is readily seen in Fig. 4. The larger sprocket 115 on shaft 116 is in alignment with an adjustable sprocket 118 supported in a slot 119 on an angular frame member 120 which is fixed to the rear of frame member 14. A brace member 121 extends from plate 117 to the top of member 120.

The larger sprocket 115 and the adjustable sprocket 118 are connected by a measuring chain 122 having a high link 123. A conventional mercury switch 124 has a mercury bulb 125 held by bracket 140 which is pivoted on pin 142 on the plate 117 in a position normally above the surface of the measuring chain 122. The mercury switch 124 is on a control circuit with the solenoid 29 which controls the drive roller 21. The bulb 125 pivots from a normally open down position to an up closed circuit position under the cam lifting action of high link 123 momentarily and will regulate through a conventional line starter the cutting device in a manner to be described below. The measuring device operates to control the length of material 71 which is fed across the roller 21 and to place the cutting device 46 in operation at the proper instant.

In the operation of the measuring device, the measuring discs 106 and 107 are positioned by the frame 99 to press against the top of a continuous material 71 being fed across and by the roller 21. In order to assure that the proper pressure is being applied by the pickers 106, 107 an adjustment means is provided on the shaft 90 comprising a bracket 126 supporting an idler sprocket 127 which abuts the chain 112. The idler sprocket 127 is movable by a screw 128 in a direction either toward or away from the chain 112. Moving the idler sprocket 127 against the chain 112 forces the pickers 106 and 107 against the material 71 on the roller 21 and moving the sprocket 127 away from the chain 112 relieves the pressure of the pickers against the material 71. This provides an accurate adjustment of the pickers 106, 107 and assures an accurate rotation of the measuring chain 122.

With the roller 21 in operation carrying the material 71 from the back of the machine over the top of the roller 21 and down in a vertical direction behind the frame member 15, the movement of the material 71 against the discs 106 and 107 rotates the discs 106 and 107 in a direction opposite from the direction of the roller 21. This movement is transferred through the chains 112 and 113 to sprocket 115 which moves the measuring chain 122 in a path beneath the mercury bulb 125. The length of the chain 122, measured from the high link 123 around and back to the high link 123, governs the extent of travel of the material 71 across the roller 21 prior to the contacting of the mercury bulb 125 by the high link 123. Accordingly, the number of turns of the roller 21, and therefore the length of the material 71 which passes over the roller 21, is controlled by the length of travel of the measuring chain 122. By varying the length of the measuring chain 122, the length of travel of the roller 21 may be increased or decreased. This is readily done by separating two of the links in the chain 122, moving the sprocket 118 in the slot 119, and adding or removing links from the chain 122.

The measuring discs 106 and 107 also act to keep the material 71 firmly on the roller 21 and to prevent any slippage or over accumulation of the material 71 on the roller 21. Further, with the quills 108 entering the material 71 during the rotation of the discs 106 and 107 an accurate ratio between the numbers of turns of the roller 21 and the travel of the chain 122 is maintained to assure a proper length of material measured for cutting.

In the operation of the machine as a unit the roller 21 is synchronized through a conventional magnetic line starter 130 with the cutting device 46 by means of the switches 88 and 124, the solenoid 29, the motor 72, and the measuring chain 122, to feed a pre-selected length of material 71 across the roller 21. At the proper length of material 71, the feeding of the roller is stopped on disengagement of the clutch 25. As soon as the feeding of the material 71 is stopped, by the solenoid 29 through the action of switch 124, the motor 72 is energized to drive the cutting device 46 across the material 71 thereby cutting the proper length. The wide link 131 trips switch 88 stopping the motor 72. Then the roller 21 resumes feeding another length of material for the preselected length which in turn is cut and so on with successive lengths of material.

The electrical circuit of Fig. 7 provides a completely automatic operation of the machine. The electricity for the motor 72 and solenoid 29 is provided through a line 129 which enters a conventional line starter 130, preferably of the magnetic type. The drive motor 72 is controlled through the mercury switch 124, which serves as an "on" switch and the switch 88, which serves as an "off" switch. Switch 88 is spring tensioned to remain closed normally, but is opened when the lever 89 of the switch 88 is contacted by the wide link 131. The solenoid 29 is wired into the starter 130 and to the switches 88 and 124 so that at the same time that the motor 72 is energized, the solenoid 29 is actuated to disengage the clutch 25. Line starter 130 is of conventional construction and includes a movable armature 134 having spaced bar contactors 136 fixed thereto each of which is positioned adjacent a pair of opposed contacts so that when the armature is moved upwardly a slight distance the bars 136 close a circuit across the respective contacts. Line 129 is preferably of the conventional three wire type L1, L2, and L3 and each of these lines enters one side of the starter 130 and connects to a respective contact point. Line starter 130 also has a magnetic coil 138 positioned to exert an upward pull on armature 134 when energized which coil 138 receives L1 leading in and in conventional "on-off" control circuit manner has wire "a" leading out and on to one side of mercury "on" switch bulb 125. Wire "a" comes from the other side of mercury switch bulb 125 thence to one side of "off" switch 88. The other side of switch 88 picks up wire "b" leading back to L3. The opposite sides of three pairs of the line starter contacts are line contacts and are connected to a respective continuation of L1, L2, L3 leading directly to motor 72 which controls the driving of chain 84. Across L2, L3 just preceding the motor 72, is connected the solenoid 29 so that no current flows to motor 72 or to solenoid 29 unless the bar contactors 136 are against their respective contacts which happens simultaneously when the armature 134 moves upwardly. A fourth pair of contacts X and Y are arranged with a wire "c" going from X to the same side of mercury switch as the incoming "a" wire and with a wire "d" going from Y and connecting to the "a" wire between switch bulb 125 and switch 88.

Keeping in mind that switch 124 is normally open at bulb 125 but momentarily closes when bulb 125 is lifted by 123 then opens again and that switch 88 is normally spring tensioned closed but opens momentarily when struck by 131 then closes again, the momentary closing at switch bulb 125 closes a circuit from L1 through coil 138, through the wire "a," through switch bulb 125, through the other side of "a" wire, through switch 88, thence through "b" wire back to L3. This momentary energization of coil 138 is sufficient to lift armature 134 thereby closing all contacts in the line starter 130 so that current flows through L1, L2, L3 simultaneously to the motor 72 and to the solenoid 29. Immediately thereafter, member 123 having been moved on past bulb 125 by the last movement of the material, switch bulb 125 drops by gravity to open position but the circuit through coil 138 remains closed by virtue of the current flowing through "a" through "c" through the bar contactor 136 across X and Y, across through "d," through switch 88, thence through "b" back to L3. Momentary opening of switch 88 by the link 131 will break the last mentioned circuit dropping the armature 134 thereby de-energizing the motor 72 and solenoid 29 and the circuit will thereafter remain open even though switch 88 immediately returns to closed position since reenergization must take place through coil 138 and this is accomplished only through the momentary closing of switch 124 at bulb 125 upon reaching the next desired length of material. With this arrangement, the circuit is open at the "on" switch during the driving of the roller 21 and the cutting device 46 is in its normal position away from the material. The "on" switch 124 is actuated by a high link 123 in the measuring chain 122. Roller 21 receives power from an individual outside source. In like manner, cutter motor 46 receives a separate power.

Assuming that the cutting device 46 has just made a cut on the material 71 and returned to its normal position, the circuit would be open and the roller 21 is driving the material 71 through the machine from the power source at 38. The high link 123 in the measuring chain 122 is just in front of the mercury bulb 125. As the material 71 passes over the roller 21, it drives the measuring discs 106 and 107 thereby driving the measuring chain 122 in a clockwise direction. After a preselected length of material 71, depending upon the selection of the chain 122, has passed over the roller 21 the measuring chain 122 has made a complete revolution and the high link 123 momentarily lifts the mercury bulb 125 to make up the starter 130 and then drops the bulb 125 to its normal open position. The starter 130 energizes the motor 72 and at the same instant energizes the solenoid 29 which actuates the clutch 25 to stop the roller 21. The motor 72 drives the cutting blade 60 across the width of the material thereby severing the material 71 in the slot 66. As the wide link 131 rounds the sprocket 79 it strikes the switch 88 breaking the circuit in the starter 130 thereby cutting off the motor 72 and releasing the solenoid 29 which permits the clutch 25 to engage and the roller 21 to resume the transfer of the material 71. The wide link 131 is located so that the switch 88 is struck just as the cutting device 46 passes the edge of the material 71 near sprocket 81 and the cutting device 46 returns to its initial position near sprocket 81 and out of the path of the moving material 71.

After the completion of one cutting of the material 71, the measuring chain 122 begins another rotation during the movement of the material 71 and repeats the cutting operation for each successive pre-selected length of material 71 passing over the roller 21. The cutting of successive lengths of material is completely automatic. If it is desired to change the length of the material being cut, then it is only necessary to replace the measuring chain 122 with a different chain in ratio to the number of turns of the roller 21 desired.

In its movement across the track 41, the cutting blade 60 cuts the material 71 in the slot 66 in such a manner that a portion of the curved blade 60 engages the thickness of the material 71 as the blade itself is moving across the width of the material. This assures a clean cut, especially where the material 71 is of a sturdy fiber and substantially thick. In addition, since the cutter 46 oscillates from one side of the machine to the other side and back again, the blade 60 passes across the severed width of the material on its return and trims off any stringy fibers which might not have fallen during the initial cutting.

It will be obvious to those skilled in the art that various modifications and substitutions may be made in the present embodiment without departing from the scope of the invention as defined in the appended claims.

We claim:

1. In a cutting machine of the class described, a frame, a drive roller positioned on said frame for transferring a continuous material, clutch means operably connecting said drive roller to a power source, a solenoid control for said clutch means, a track member fixed on said frame substantially coextensive with said drive roller, a driven cutting blade mounted for movement on said track member, a slot formed on said machine coextensive with said track member and adjacent to the material passing over the drive roller, said cutting blade protruding into said slot normally out of contact with the material, transfer means for moving said cutting blade on said track into contact with said material, power means for said transfer means, a measuring frame positioned above said drive roller, a plurality of measuring discs rotatably mounted in contact with the material on said roller, a measuring chain driven by said picker discs, a high link on said measuring chain, a first switch adapted to be controlled by said measuring chain, and a second switch adapted to be controlled by said transfer means, said first switch opening the circuit to stop the roller and start the transfer means, said second switch adapted to stop the transfer means and start the roller, whereby pre-selected lengths of the material are automatically measured and cut in succession on the machine.

2. In combination with a machine having a drive means for transferring a continuous material, and incorporating means for measuring the length of material fed, a track member having slots formed thereon, a base support plate having wheel members mounted for rotation in said slots, power means on said machine, a first sprocket on said machine, a second sprocket on said machine, a continuous member connecting said first and second sprockets, contact means on said continuous member, a connecting rod having one end thereof pivotally connected to said base plate and said other end pivotally connected to said continuous member, means for driving one of said sprockets and thereby driving said continuous member around said sprockets, a rotary cutting blade carried by said base member, drive means from said power means to said cutting blade, said cutting blade normally being out of contact with one side of said material but being brought into contact with said material upon movement of said continuous member, and a control means adapted to be contacted by said contact means to stop the movement of said base support plate, whereby the cutting blade severs through the edge of said material and across said material transversely upon the cessation of movement of the material drive means and said cutting blade is returned to initial position.

3. In a cutting machine, a frame, a material transfer means, electrical control means for said material transfer means, a cutting means, endless drive means for moving said cutting means, electrical control means for starting and stopping said endless drive means, at least one first measuring member in continuous moving contact with said material, a second measuring member connected with and adapted to register the extent of movement of said first measuring member, and switch means adapted to be actuated by said second measuring member to stop the feeding of said material and to start said endless drive means, and other switch means contactible by a portion of said endless drive means to stop said cutter movement and to start said material moving.

4. In a cutting machine of the class described, a machine frame, a drive means on said frame for transferring a continuous material, first electrical control means for selective interruption and activation of said drive means, first switch means for actuating said control means, a cutting carriage mounted on said frame for transverse movement across said material, endless drive means for propelling said cutting carriage transversely across said frame, electric power means for said endless drive means, measuring means responsive to the movement of the material and having contact means adapted to activate said electric power means at a pre-selected length of material and to actuate said first switch means to cause interruption of the material feeding substantially simultaneous with the endless drive activation, circuit actuating means on said frame adjacent the path of and actuatable during the movement of said endless drive means for causing said drive means to resume material movement, and contact means on said endless drive means for contacting said circuit actuating means to cause said material to move and said cutter to stop.

5. Apparatus for automatically measuring and cutting continuous material comprising, means for feeding the material across a cutting surface, measuring means responsive to the surface movement of the material as it is fed and including a switch actuation means operable as the pre-selected length reaches the cutting surface, first switch means operable by said switch actuation means, electrical control means operable through said first switch means for selectively activating and de-activating said material feed means thereby momentarily stopping said material at said cutting surface when it reaches the desired length, a continuous drive means positioned on said frame, a cutter support means movably positioned on said frame, a cutting blade movably mounted on said carriage normally out of contact with said material when said cutter support is out of cutting position, said cutter blade being movable with said cutter support against said material to make a transverse cut thereon, electric power means for said continuous drive means, circuit means relating said electric power means with said first switch means, driving engagement means between said continuous drive means and said cutter support for selectively moving said cutting blade against and in cutting engagement with said material and actuatable at one point in the movement of said cutter carriage to stop said cutter carriage with the cutting blade out of contact with said material and to start said material feeding by operating said electrical control means.

6. Apparatus for automatically cutting measured lengths of material from continuous stock comprising, a transfer means for feeding said material across a cutting surface, power means for said transfer means, electrically controlled means for selectively discontinuing said power on said transfer means, first switch means for said electrically controlled means, a measuring means responsive to the surface movement of the material to measure pre-selected lengths thereof in succession and including switch actuation means arranged to actuate said first switch means when said material reaches the desired length at the cutting surface, a cutter carriage mounted for transverse movement on said frame across said material and having a power driven cutting blade mounted thereon normally out of contact with said material adjacent one side edge thereof, an endless drive member mounted for transverse movement on said frame, electrical power means for said endless drive member, connecting means placing said cutter carriage in engagement with said endless drive member for movement therewith, circuit means associating said first switch means with said electric power means so that said cutter carriage is activated simultaneously with the de-activation of said transfer means, second switch means in circuit with said electrically controlled means and said electric drive means for stopping said cutter out of contact with said material simultaneously with the starting of said material feeding, and switch contact means operable by the endless drive member to actuate said second switch means when said cutting is substantially completed, said measuring means being in continuous operation during the movement of the material to initiate successive cycles of cutting.

7. Apparatus for automatically measuring and cutting pre-selected lengths of material from continuous stock, a machine frame, means on said frame for feeding said material across a cutting surface including a power driven material transfer member, first control means responsive to an electric current for selectively activating and de-activating the power transfer member, measuring means responsive to the movement of the material for measuring a pre-selected length passing across said cutting surface, said first control means being actuatable by said measuring means upon reaching the pre-selected length of material at the cutting surface to temporarily discontinue power on said power transfer member, a cutter carriage mounted on said frame for movement transversly across said material at the cutting surface and having a cutting blade engageable with said material during the movement of said carriage, an endless cutter carriage drive means selectively power driven on said frame and having means thereon actuatable through movement of said endless means to engage said cutter carriage and propel it across the frame, electrical power means for said endless drive means and in circuit with said first control means operable by said measuring means to cause simultaneously with cessation of movement of said material the traversal of said cutter to cut the material, and second control means in circuit arrangement with said other control means and actuatable during the completion of the cut to stop said carriage out of contact with the material and to start the feeding of the material which actuates the measuring means for another cycle of cutting.

8. In a cutting machine of the class described, a frame, material drive means positioned on said frame for transferring a continuous material with the width thereof transversely disposed on said frame, cutter carriage guide means fixedly mounted on said frame and substantially in alignment with the width of material fed, a cutter carriage mounted on said carriage guide means for movement across said frame, a rotatable power driven disc cutter blade carried by said carriage and being normally out of contact with said material, endless cutter drive means transversly disposed on said machine frame adjacent said cutter carriage guide means, electric power means for said endless drive means, clutch means for said material drive means, electrical clutch control means on said frame, a driving engagement means engaging said cutter carriage with said endless drive means to transfer said cutter blade into contact with said material, electrical control means for said endless cutter drive means, measuring means responsive to the movement of a length of material fed, an electrical "on" switch actuatable for said electric power means by said measuring means upon the material reaching a pre-selected length, said "on" switch being in circuit with the control switch for said electrical clutch control means so that the material feeding is stopped simultaneously with the energization of the electric power means, and other electric switch and control means actuatable by a switch contact member on said endless means to stop said cutter and to start the movement of the material after the cutting blade is out of contact with the material.

9. Apparatus for automatically measuring and cutting continuous material comprising, means for feeding the material across a cutting surface, drive means for said material feeding means, electrically controlled means for selectively disengaging said drive means from said last named means, measuring means responsive to the surface movement of the material as it is fed and including a switch actuation means operable as the pre-selected length reaches the cutting surface, first switch means operable by said switch actuation means, circuit means placing said switch means and said electrically controlled means in operable connection so that said material feeding is selectively interrupted upon the material reaching a selected length as determined by said measuring means, continuous drive means movably positioned on said frame, a cutter support means movably positioned on said frame, a power driven cutting blade positioned on said cutter support, said cutter support being movable on said frame from a position with said cutting blade out of contact with said material to a position where said cutting blade engages said material, electric power means for driving said continuous drive means and in circuit with said circuit means, said power means being activated by said first switch as said solenoid dis-engages said material drive, driving engagement means between said continuous drive means and said cutter support for selectively moving said carriage to place said cutting blade against said material, second switch means in circuit with said circuit means for stopping said cutter support in a position with said cutting blade out of contact with said material, and switch contact means associated with said cutter support and said continuous drive means for contacting said second switch after the material has been cut.

References Cited in the file of this patent

UNITED STATES PATENTS

| | | |
|---|---|---|
| 1,732,636 | Gautier et al. | Oct. 22, 1929 |
| 1,797,638 | Collins et al. | Mar. 24, 1931 |
| 1,819,991 | Stevens | Aug. 18, 1931 |
| 2,374,281 | Gheen | Apr. 24, 1945 |
| 2,506,750 | Suprenant | May 9, 1950 |
| 2,544,241 | Sternad et al. | Mar. 6, 1951 |